2,907,418
HIGH SHEAR STRENGTH FASTENER

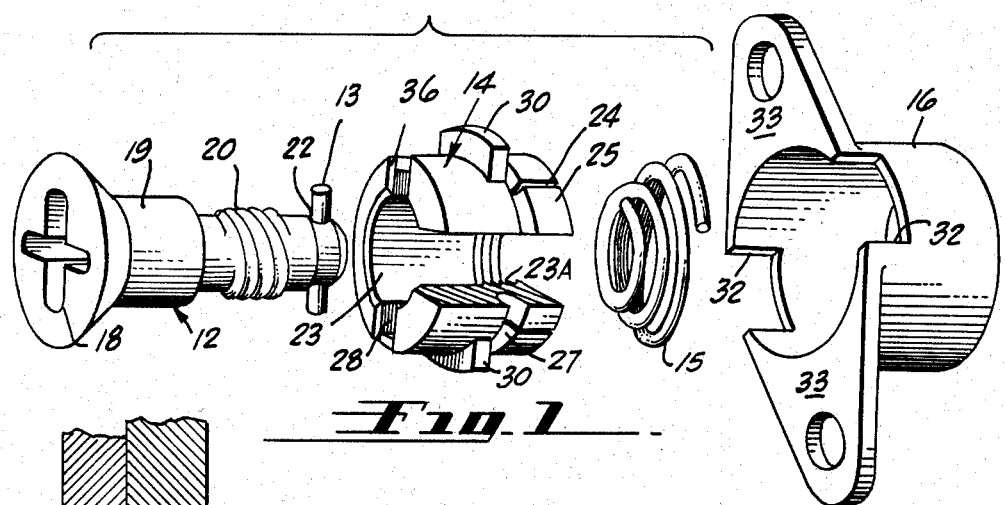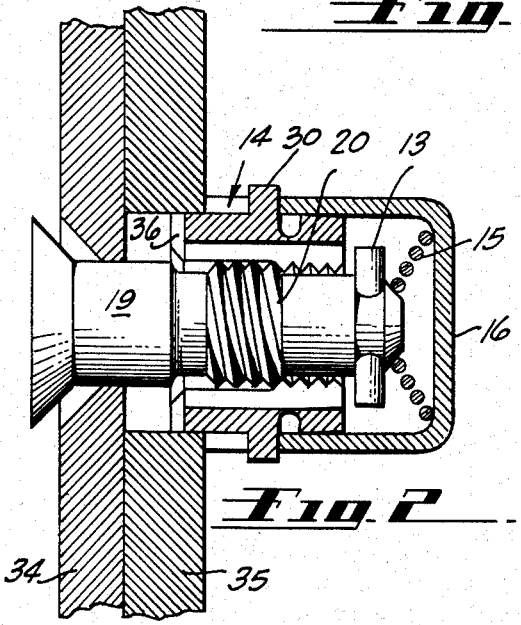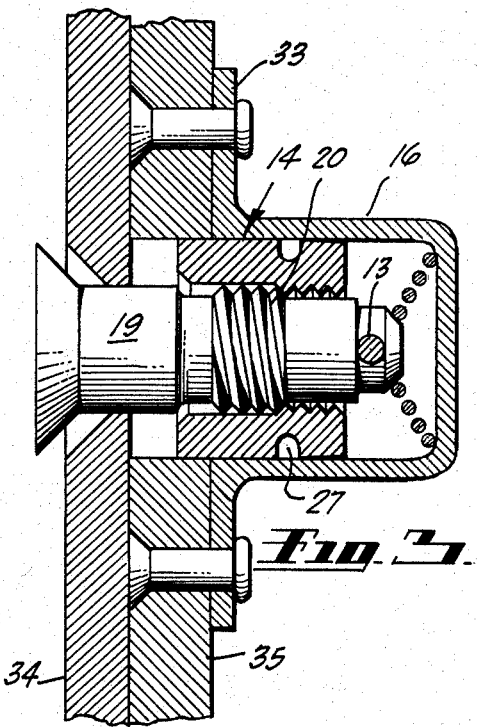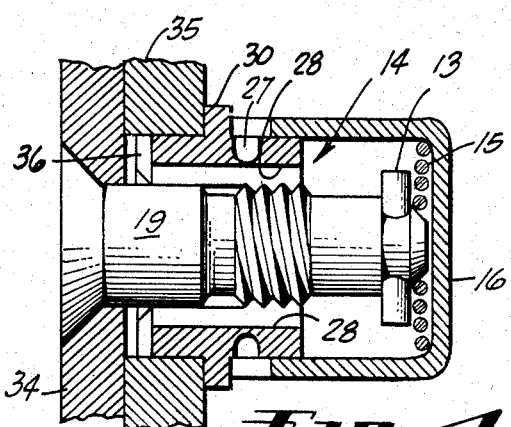
INVENTORS
GEORGE A. HUDSON
EMERSON H. LABOMBARD &
OSCAR A. SWANSON
BY Edwin Coates
ATTORNEY

United States Patent Office 2,907,418
Patented Oct. 6, 1959

George A. Hudson, Venice, and Emerson H. La Bombard and Oscar Alfred Swanson, Pacific Palisades, Calif., assignors to Douglas Aircraft Company, Inc., Santa Monica, Calif.

Application January 19, 1954, Serial No. 404,968

5 Claims. (Cl. 189—36)

This invention relates to fastening members and particularly to a high shear strength fastener capable of securing plates or other parts in facewise engagement in a manner whereby loads exerted along the plane of one sheet are transmitted through the fastener to the other sheet.

The fastener herein disclosed is particularly useful in aircraft of the stressed skin type requiring the presence of access openings normally covered by sections of the stressed skin. It is frequently the practice to cover access openings with non-stress bearing sheets or panels which are secured by means of quick detachable fasteners commonly referred to as cowling fasteners. However, the use of non-stressed panels is not desirable since the stress pattern around the opening is modified resulting in higher loads in neighboring structural units. These higher loads obviously necessitate an increase in size and hence in the weight of such neighboring structure. By the use of the fastening means of this invention there is afforded a means by which a closure panel may be rapidly secured in place over the opening and in stress bearing relation with adjacent cowling, fuselage, or wing metal skin.

A fastener constructed in accordance with the present invention consists essentially of a nut with a partially threaded bore, the unthreaded portion serving as a bearing surface cooperating with a mating portion of a second screw part. The panels are maintained snugly in facewise relation by radial ears on the nut engaging the inner surface of the inner sheet and the head of the screw engaging the outer face of the outer sheet. There are additionally a nut retaining cup, screw ejecting spring and a cross pin for the screw to prevent its accidental loss from the access closure panel.

The details of construction of a preferred embodiment of the invention are shown in the accompanying drawings in which:

Figure 1 is an exploded perspective view of the fastener assembly with portions thereof broken away;

Figure 2 is a sectional view of the assembly on a plane through the axis of the screw;

Figure 3 is a view similar to Figure 2 but taken on a plane at a right angle thereto;

Figure 4 is a view similar to Figure 2 showing the nut and bolt in fully engaged or locked relation.

Referring now to the drawings and especially Fig. 1 it will be seen that the preferred form of the invention comprises essentially five parts, namely screw 12, pin 13, nut 14, eject spring 15 and nut retainer 16.

Screw 12, here shown as a flush head type, is provided with the usual screw driver slot 18. The shank of screw 12 includes unthreaded portion 19 having a constant section and threaded portion 20 whose crest diameter is slightly less than the diameter of portion 19. The end of the screw shank opposite the head is provided with a small diametrical bore 22 in which pin 13 is press fitted or otherwise held for a purpose hereinafter set out. Cooperating with screw 12 is nut 14 having a smooth surface bore 23 of a diameter approximating the diameter of shank portion 19 for bearing contact therewith. Screw threads 23a form a continuation of smooth surface bore 23 and are adapted for mating engagement with threads 20. In order that the screw 12 may be tightly engaged by nut 14 to eliminate accidental loosening due to vibration, slots 24 are suitably formed in the threaded end of nut 14 to define fingers 25 enabling that portion of the nut to be crimped and yieldingly expand in response to the radial pressure exerted by virtue of the presence of the screw 12. In the instances wherein thick walled nuts are employed it may be additionally required that a circumferential groove, such as indicated at 27, be formed in the nut so that fingers 25 may more easily flex. As best shown in Figs. 1 and 4, nut 14 is provided with diametrically opposed channelways or slots 28, 28 extending the full length thereof. It is the function of these slots to permit the pin 13 to pass therethrough prior to the bringing of the screw 12 and nut 14 into screw threaded engagement. It is to be noted that the shank of screw 12 is unthreaded back from the pin receiving hole 22 a distance slightly greater than the extent of threads 23a in nut 14 so that the screw may be thrust axially into nut 14 sufficiently that pin 13 does not hinder the rotation of the screw. Extending outwardly from the nut body are ears 30, 30 adapted to engage the exposed face of one of the sheets being secured together.

Since the nuts are generally inaccessible when the cover plate is in place thus preventing the use of a wrench, and it is necessary to retain the nut in place when the structure is disassembled, a form of nutplate is usually employed to position the nut and prevent it from turning. In the instant application a cylindrical retainer 16 having one end closed is used. To accommodate ears 30, 30 on nut 14, cutouts 32, 32 are provided in retainer 16 and serve to prevent rotation of the nut during engagement therewith of screw 12. Mounting ears 33, 33 have openings therein whereby the nut retainer 16 may be suitably secured to the face of the sheet metal by rivets or like fasteners.

Interiorly of retainer 16 eject spring 15 is assembled. In use this spring will operate to urge screw 12 outwardly whereby once screw retaining pin 13 is positioned with its ends in slots 28, 28 it will remain in that position. By this means a mechanic in removing the panel may successively loosen the retaining screws and at the end of the operation there will be no necessity of realigning the pins with the nut slots. The removal operation is thereby facilitated. It is evident that pin 13 will serve to maintain screw 12 in association with the cover panel when the panel is removed. In this manner accidental loss of retaining screws is obviated.

The retainer 16, in addition to its function of maintaining or positioning nut 14, is constructed and dimensioned to afford a highly desirable advantage in the removal and replacement of cover plate 34. In this respect it is to be noted that the depth of slots or cutouts 32 substantially exceeds the thickness of nut ears 30 whereby, as evident in Figure 2, nut 14 may be partially withdrawn from the opening in sheet 35. By this arrangement, preparatory to removal of the panel, the bolts may be individually retracted, then, by imparting a partial rotation thereto, pin 13 will ride up the chamfered surfaces 36, bounding the entry portions of slots 28, and out of alignment with slots 28. By this action the nut 14 is ejected a slight extent outwardly of the opening in plate 35. The advantage offered thereby will be apparent when considering a pivoted closure plate wherein the hinge point lies close to the shear bolt. In this instance during pivoting of the closure the comparatively long bolt shank 19 and pin 13 will strike an arc of noticeable curvature which, if the bolt is not first withdrawn an extent greater than indicated in Figure 2, will carry them into binding engagement with the nut. Such action would greatly hamper an individual in removing the closure panel in view of the numerous units used to secure a single panel, any one of which if not properly positioned preventing such removal. The sliding nut feature afforded by this invention enables the mechanic or inspector to sequentially loosen the bolts and disalign the pins and slots and at the end of the operation immediately remove the panel, the possibility of binding having been eliminated. In replacing the panel, the sliding action of nuts 14 enables the pins 13 to enter the confines of the opening in plate 35 even though such pins may not be aligned with the slots 28 of nuts 14. In this manner cover 34 can be initially pressed flush into engagement with panel 35 regardless of the relative positions of the nuts and mating bolts.

In use the high shear fastener is shown securing cover plate 34 to panel 35. Nut retainer 16 with spring 15 and nut 14 assembled in place is riveted to the inner face of panel 35. The opening in the panel is the same size as nut 14 and is in bearing contact with the outer nut surface when in the position shown in Fig. 4. Cover plate 34 is provided with an opening through which extends screw 12, the opening snugly receiving the head and adjacent shank portion of the screw to have good bearing contact therewith. It will be readily apparent from the showing in Fig. 4 that plate 34 and panel 35 are tightly drawn together between ears 30, 30 of nut 14 and the head of screw 12. Any loads applied through panel 35 along the plane thereof will be transmitted in bearing through nut 14 to screw 12, which in turn will transmit the loads to cover plate 34. The bearing fits between the panel, nut, pin, and cover plate are made snug so that there will not be any looseness or play in the assembly. In this manner plate 34 is made structurally integral with the neighboring panels, thereby eliminating the necessity of reinforcing stressed skin in the vicinity of access openings.

It will be apparent to those skilled in the art that various changes and modifications may be made in the construction disclosed wihout departing from the spirit of the invention, and it is intended that all such changes and modifications shall be embraced within the scope of the following claims.

We claim:

1. A high shear fastener adapted to extend through aligned openings in two sheet-like members and releasably secure the members together, comprising: a nut having a bore therethrough, a portion of the length of said bore being screw-threaded, the remaining portion being unthreaded and having a diameter greater than the root diameter of the screw-threaded portion, said nut being also provided with diametrically opposed axial through channelways extending radially from said bore; a bearing surface on the nut periphery located outwardly of the unthreaded bore portion, said bearing surface being adapted to be snugly received within the opening in one of the sheet-like members; external ears projecting outwardly from a midposition on the said nut and adapted to engage a face of said one of the sheet like members to prevent the nut from passing through the plane of the sheet surface opposite the face engaged by the ears; a nut retainer for housing said nut and having means adapting it to be secured to said one sheet to maintain the nut in axial alignment with the opening in said one sheet, said retainer having shallow cutouts through which said ears project; a headed screw having a shank including a constant section bearing portion and a screw threaded portion for respectively cooperating with the unthreaded and threaded portions of said nut bore, the bearing surface being extended to a point adjacent the screw head to have contact with the material defining the opening through the other said sheet-like member; a retaining pin affixed to the shank at the end opposite the screw head, the extremities of the pin being adapted to pass axially through said nut channelways; and an eject spring in the nut retainer for resiliently urging said screw axially out of said nut bore.

2. In a high shear joint, first and second facewise engaging structural members having axially aligned openings therein, the diameter of the opening in the first member being greater than the diameter of the opening in the second member; a nut having an external bearing surface inserted into and snugly engaging within the opening in the first member; laterally extending stop means on the nut limiting the extent of insertion of the bearing surface into the opening; an internal bearing surface and screw threads in the nut and forming a bore therethrough, the internal bearing surface being of a diameter equal to the diameter of the opening in the second member and being opposed to the external bearing surface; a headed bolt having a shank including a bearing portion and a screw threaded portion passing through the opening in the second of said structural members and into respective engagement with corresponding portions in the nut, the bearing portion of the bolt also being snugly received within the opening in said second member, the nut and bolt serving to tightly maintain the structural members in their facewise engagement and to transmit shear forces therebetween; retaining means protruding radially of the bolt at the end opposite the headed end, the radial extent of said retaining means being greater than the diameter of the opening in said second member; and passage means in said nut through which the retaining means passes when the bolt is inserted in the nut.

3. In a high shear joint, first and second facewise engaging structural members having axially aligned openings therein, the diameter of the opening in the first member being greater than the diameter of the opening in the second member; a nut having an external bearing surface inserted into and snugly engaging within the opening in the first member; laterally extending stop means on the nut limiting the extent of insertion of the bearing surface into the opening; an internal bearing surface and screw threads in the nut and forming a bore therethrough, the internal bearing surface being of a diameter equal to the diameter of the opening in the second member and being opposed to the external bearing surface; and a headed bolt having a shank including a bearing portion and a screw threaded portion passing through the opening in the second of said structural members and into respective engagement with corresponding portions in the nut, the bearing portion of the bolt also being snugly received within the opening in said second member, the nut and bolt serving to tightly maintain the structural members in their facewise engagement and to transmit shear forces therebetween; retaining means extending radially of the bolt at its end opposite the headed end, the retaining means being axially spaced away from the screw threaded portion of the shank a distance at least equal to the extent of the screw threads in the nut whereby the retaining means will protrude past the screw threads in the nut prior to engagement of the last said threads by the threads on the bolt; and means adjacent the bore in the nut through which the retaining means pass when the bolt is inserted in the nut.

4. The construction as defined in claim 2 wherein there is provided a housing member embracing the nut and maintaining it in alignment with the opening in the first of said structural members; and a spring in said housing member for ejecting the bolt axially out of the nut bore.

5. The construction as defined in claim 2 and including retaining means embracing the laterally extending stop means on the nut to maintain the external bearing surface thereof at least partially within the opening in the first member.

References Cited in the file of this patent

UNITED STATES PATENTS

| | | |
|---|---|---|
| 363,074 | Lockwood | May 17, 1887 |
| 2,123,068 | Summers | July 5, 1938 |
| 2,210,048 | Swanson | Aug. 6, 1940 |
| 2,384,729 | Darby | Sep. 11, 1945 |
| 2,396,142 | Allen | Mar. 5, 1946 |
| 2,442,064 | Veit | May 25, 1948 |
| 2,486,411 | Huelster | Nov. 1, 1949 |
| 2,571,641 | Wing | Oct. 16, 1951 |